United States Patent [19]
Jenkins

[11] Patent Number: 4,468,067
[45] Date of Patent: Aug. 28, 1984

[54] DISPLAY CASE WITH A HOOK LOCKING MECHANISM

[75] Inventor: Claire L. Jenkins, De Forest, Wis.

[73] Assignee: Rock Leasing, Inc., Longmont, Colo.

[21] Appl. No.: 407,068

[22] Filed: Aug. 11, 1982

[51] Int. Cl.³ .............................................. F16B 12/44
[52] U.S. Cl. ..................................... 312/140; 312/111; 312/257 SK; 312/263; 403/20; 403/252
[58] Field of Search ................. 52/280; 403/246, 252, 403/195, 196, 187, 255, 19, 20; 211/182; 312/140, 111, 257 SK, 263, 195; 292/19, 25

[56] References Cited

U.S. PATENT DOCUMENTS

| | | | |
|---|---|---|---|
| 3,132,910 | 5/1964 | Vigna | 312/140 |
| 3,945,743 | 3/1976 | Koch | 312/257 SK |
| 4,021,129 | 5/1977 | Sykes | 403/252 |
| 4,368,936 | 1/1983 | Worrallo | 52/280 |

FOREIGN PATENT DOCUMENTS

| | | | |
|---|---|---|---|
| 2304808 | 10/1976 | Fed. Rep. of Germany | 312/140 R |
| 2723058 | 11/1978 | Fed. Rep. of Germany | 411/437 |
| 2410168 | 7/1979 | France | 411/437 |

Primary Examiner—James T. McCall
Assistant Examiner—Joseph Fall
Attorney, Agent, or Firm—James Earl Lowe, Jr.

[57] ABSTRACT

A display case with a locking mechanism for securing display case components together comprising a first member including hook means, a second frame member including hook means adapted to interlock with the first member's hook means, and means for biasing the second member's hook means into engagement with the first member's hook means, so the first member's and the second member's hook means interlock.

11 Claims, 5 Drawing Figures

U.S. Patent    Aug. 28, 1984    4,468,067
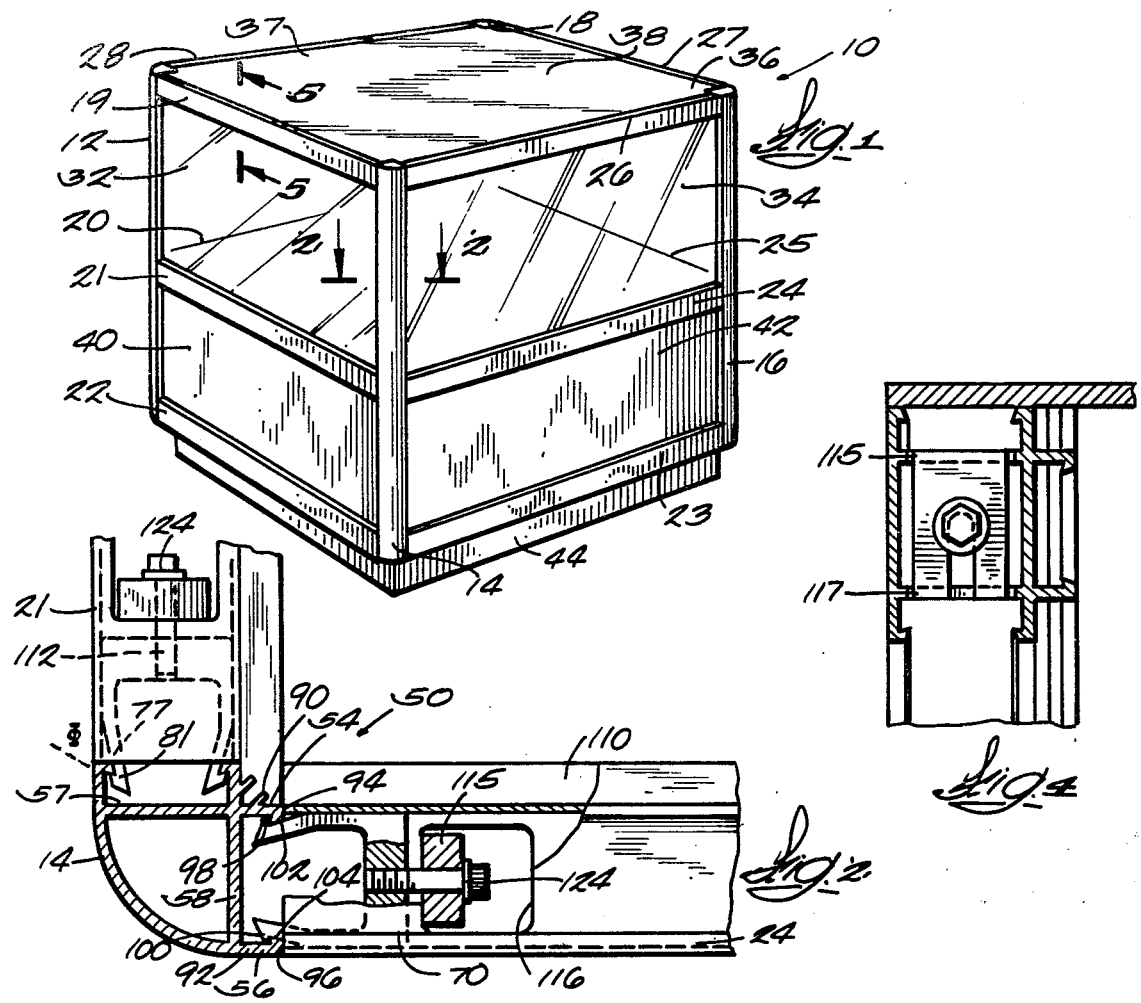
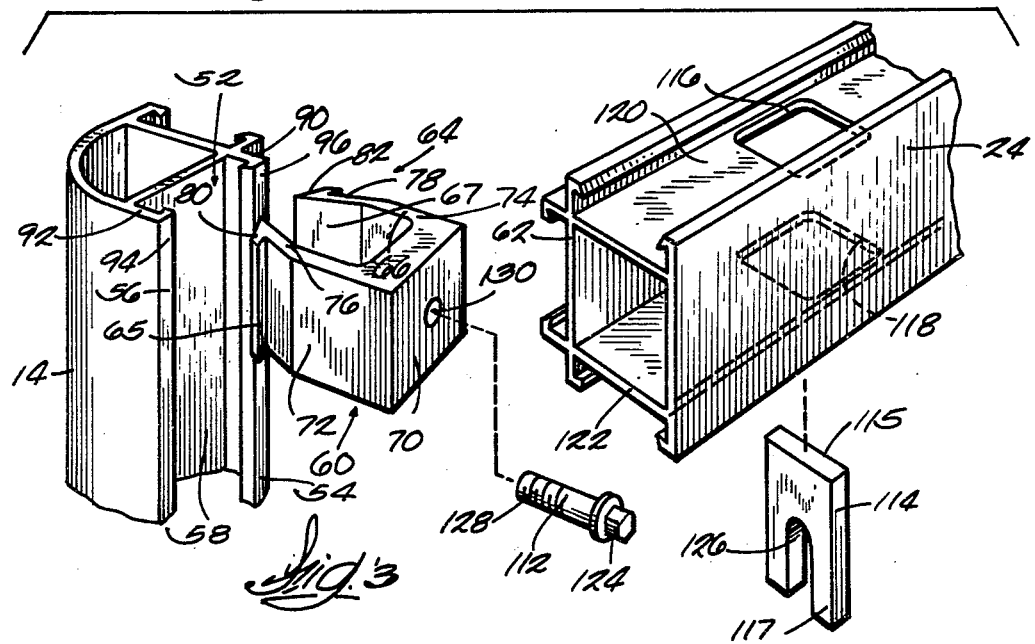

DISPLAY CASE WITH A HOOK LOCKING MECHANISM

BACKGROUND OF THE INVENTION

This invention relates to display cases and, more particularly, to means for securing display case components together to form a display case.

SUMMARY OF THE INVENTION

The principal object of this invention is to provide a simple, attractive means for securing display case components together to form a display case.

Another object of this invention is to provide a locking mechanism which allows the display case to be both easily assembled and disassembled.

For the achievement of the above and other objectives, this invention provides a display case with a locking mechanism for securing display case components together. The display case includes a first member including hook means, a second member including hook means adapted to interlock with the first member's hook means, and means for biasing the second member's hook means into engagement with the first member's hook means, so the first member's and the second member's hook means interlock.

In one embodiment of this invention the display case includes an elongated member including hook means comprising a pair of opposite, spaced apart, inwardly facing hooks attached to the side of the elongated member. The inwardly facing hooks extend generally the entire length of the side of the elongated member.

Another member is elongated and hollow and has a hook member inside an end of the hollow member. The hook member has two ends, with one end including hook means extending beyond the end of the hollow member. The hook means on the hook member are adapted to interlock with the hook means on the side of the elongated member.

The hook means on the hook member comprises a pair of opposite, spaced apart, outwardly facing hooks. The hooks on the hook member are resiliently adapted to spring inwardly to move around the elongated member's hooks. When these hooks are interlocked, the elongated member's hooks are clamped between the hook member's hooks and the end of the hollow member.

The display case includes biasing means comprising means inside the hollow member to draw the hook member's hook means toward the end of the hollow member, and into engagement with the elongated member's hook means, so that the hook member's hook means and the elongated member's hook means interlock. More specifically, the biasing means comprises a threaded bolt secured inside the hollow member by a locking member secured in openings in the side of the hollow member. The threaded bolt biases the hook member by being secured in a threaded bore in the end of the hook member opposite the end of the hook member with the hook means.

DESCRIPTION OF THE DRAWINGS

FIG. 1 is a perspective view of a display case.

FIG. 2 is a view of a corner of the display case partially in section, taken along line 2—2 in FIG. 1.

FIG. 3 is a perspective view of a looking mechanism's components.

FIG. 4 is an end view of a corner of the display case taken along line 5—5 in FIG. 1.

DESCRIPTION OF THE PREFERRED EMBODIMENT

One embodiment of this invention is depicted in FIG. 1. The display case 10 in FIG. 1 is comprised of four vertical frame members 12, 14, 16 and 18 and in this case, twelve horizontal frame members 19 through 28, (two of which are not shown). The frame members are made from extruded aluminum. Glass panels 32, 34, 36, 37 and 38 and wood panels 40 and 42 are secured between display case components in order to provide additional structure and decorative appearance to the display case 10. The assembled display case 10 may contain shelfs (not shown) for purposes of holding the merchandise to be displayed, and the display case can include a base 44.

The vertical and horizontal display case components are secured to one another by means of a locking mechanism 50. FIG. 2 shows locking mechanisms 50 on each of two sides 57 and 58 of elongated member 14. The locking mechanisms are identical so a description of one will also describe the other. The display case 10 with the locking mechanism 50 includes an elongated member 14 including hook means 52 comprising a pair of opposite, spaced apart, inwardly facing hooks 54 and 56 attached to a side 58 of the elongated member 14. The inwardly facing hooks 54 and 56 extend generally the entire length of the elongated member 14.

Another frame member 24 is elongated and hollow and has a hook member 60 inside an end 62 of the hollow member 24. The hook member 60 includes a hook means 64 or hooks 65 and 67 on one end 66. These hooks 65 and 67 extend beyond the end 62 of the hollow member 24 when the hook member 60 is inside the hollow member 24, as shown in FIG. 2. The hooks 65 and 67 on the hook member 60 are adapted to interlock with the hooks 56 and 54 on the elongated frame member 14.

As shown in FIG. 3, the hook member 60 more particularly comprises a base portion 70 with two vertical, spaced apart side portions 72 and 74 extending outwardly from the base portion 70. Extending from the ends of these spaced apart, vertical side portions 72 and 74 are a pair of second portions 76 and 78 which extend inwardly towards each other. On the ends of these inwardly extending second portions 72 and 74 is a pair of third portions 80 and 82 which extend outwardly away from each other. These second 76 and 78 and third 80 and 82 portions together form the hooks 65 and 67 which engage the corresponding hooks 56 and 54 on the elongated member.

As shown on the upper most hook member in FIG. 2, the angle $\Phi$ formed between the inwardly extending second portion 77 and the outwardly extending third portion 81 is an acute angle. The acute angle $\psi$ permits, for instance, the hooks 65 and 67 to firmly engage the corresponding hooks 56 and 54 on the elongated member 14.

Referring again to FIG. 2, the hooks 54 and 56 on the elongated frame member 14 comprises a pair of first portions 90 and 92 spaced apart and extending perpendicularly outwardly from the side 58 of the elongated member 14, and a pair of second portions 94 and 96 extending inwardly from the ends of outwardly extending first portions 90 and 92. The inwardly extending second portions 94 and 96 are shaped so that they fit into the acute angle Φ of the hooks 65 and 67 on the hook member 60, as previously described. This permits the hooks 54 and 56 on the elongated member 14 and the hooks 67 and 65 on the hook member 60 to mate and become firmly interlocked.

The hooks 65 and 67 on the hook member 60 are resiliently adapted to spring inwardly and to move around the elongated member's hooks 56 and 54 when engaging the elongated member's hooks. In order to facilitate the smooth movement of the hooks 65 and 67 around the hooks 56 and 54, the end surfaces 98 and 100 of the third portions 82 and 80 and the end surfaces 102 and 104 of the second portions 94 and 96 are coplanar when the respective hooks come into contact with each other prior to their movement around one another.

When the hooks 65 and 67 on the hook member 60 interlock with the hooks 56 and 54 on the elongated frame member 14, these hooks 65 and 56, and 67 and 54 are biased into engagement with each other by biasing means 110 inside the hollow frame member 24. This biasing means 110 serves to draw the hook member's hooks 65 and 67 towards the end 62 of the hollow member 24, so that the hook member's hooks 67 and 65 and the elongated member's hooks 54 and 56 interlock and remain interlocked.

In this embodiment, the biasing means 110 comprises a threaded bolt 112 secured inside the hollow member 24 by a locking member or clip 114. The ends 115 and 117 of the clip 114 are secured in openings 116 and 118 in the sides 120 and 122 of the hollow frame member 24, as shown in FIG. 4. The head 124 of the threaded bolt 112 is secured inside a slot 126 in the clip 114, and the end 128 of the bolt 114 is threaded in a bore 130 in the base portion 70 of the hook member 60. When the threaded bolt 114 is turned, it will pull the hook member 60 further inside the hollow member 24, thereby causing the elongated member's hooks 54 and 56 to be clamped between the hook member's hooks 67 and 65 and the end 62 of the hollow member 24.

The locking mechanism 50 can be disengaged by loosening the bolt 112, removing the clip 114, taking the hollow member 24 off of the hook member 60, and then either slipping the hook member's hooks 67 and 65 off the end of the elongated members hooks 54 and 56, or pressing inwardly on the hook member's hooks 67 and 65 and pulling outwardly on the hook member 60.

It is to be understood that the invention is not confined to the particular construction and arrangement of parts as herein illustrated and described but embraces all such modified forms thereof as come within the scope of the following claims.

I claim:

1. A display case with a locking mechanism for securing display case components together comprising
   an elongated member with a side, said elongated member including a pair of opposite, spaced apart, inwardly facing hooks attached to said side and extending generally the length thereof,
   an elongated hollow member with an end and opposed sides, each of said sides including an opening therein spaced away from said end of said hollow member,
   a locking member in said openings,
   a hook member inside said end of said hollow member, said hook member having an end and said end of said hook member including a pair of opposite, spaced apart, outwardly facing hooks, extending beyond said end of said hollow member, with said hook member's hooks adapted to interlock with said elongated member's hooks, and
   biasing means inside said hollow member and releasably connected to said locking member and said hook member and extending the whole length between said locking member and said hook member for drawing said hook member's hooks toward said end of said hollow member, and into engagement with said elongated member's hooks, so that said hook member's hooks and said elongated member's hooks interlock and said elongated member's hooks are clamped between said hook member's hooks and said end of said hollow member.

2. A display case according to claim 1, wherein said hook member has a second opposite end with a threaded bore, and wherein said biasing means comprises:
   a threaded bolt with a head and an end, said head being releasably secured by said locking member, and said end of said bolt being received in said bore.

3. A display case according to claims 1 or 2, wherein each of said hooks on said hook member is resiliently adapted to spring inwardly to move around said elongated member's hooks.

4. A display case according to claim 1, wherein said elongated member, said hook member, and said hollow member are made from extruded aluminum.

5. A display case according to claim 2 wherein said locking member includes an unthreaded opening therein which is smaller than said head of said bolt and which is larger than the threads of said bolt.

6. A display case according to claim 5 wherein said locking member comprises a plate, and wherein said unthreaded opening in said locking member comprises a slot in said plate.

7. A display case with a locking mechanism for securing display case components together comprising
   a first member including hook means,
   a hollow second member with an end and opposed sides, each of said sides including an opening therein spaced away from said end of said hollow member,
   a locking member in said openings,
   a hook member including hook means extending beyond said end of said hollow member, with said hook member's hook means adapted to interlock with said first member's hook means, and
   biasing means inside said hollow second member and releasably connected to said locking member and said hook member and extending the whole length between said locking member and said hook member for drawing said hook member's hook means towards said end of said hollow member, and into engagement with said elongated member hook means, so that said hook member's hook means and said first member's hook means interlock and said first member's hook means are clamped between said hook member's hook means and said end of said hollow member.

8. A display case according to claim 7 wherein said first member is generally elongated and has a side, and said first member's hook means are attached to said side and extend generally the length thereof.

9. A display case according to claim 7, wherein said hook member's hook means comprise a pair of opposite, spaced apart, outwardly facing hooks, and wherein said first member's hook means comprise a pair of opposite, spaced apart, inwardly facing hooks.

10. A display case according to claim 9, wherein each of said hooks on said hook member is resiliently adapted to spring inwardly to move around said first member's hooks.

11. A display case according to claim 7, wherein said first member and said hook member are made from extruded aluminum.

* * * * *